No. 872,489. PATENTED DEC. 3, 1907.
A. E. WHITNEY.
HIDE WORKING MACHINE.
APPLICATION FILED FEB. 19, 1906.
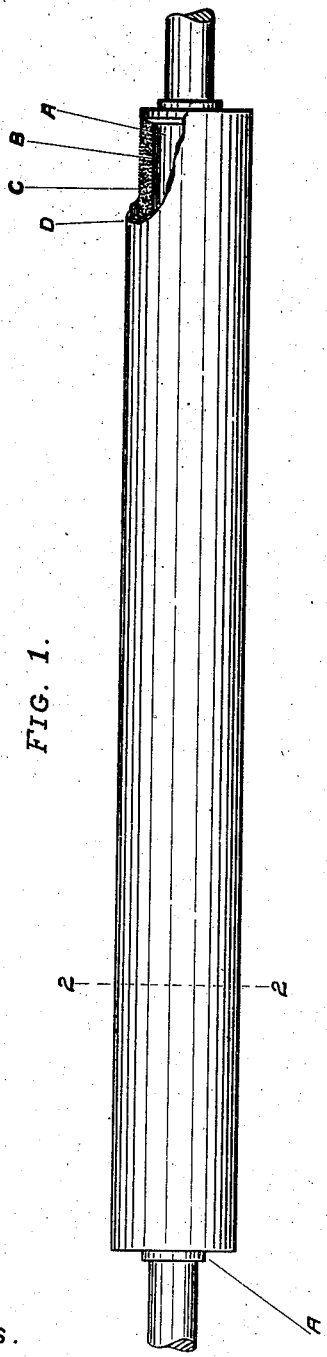
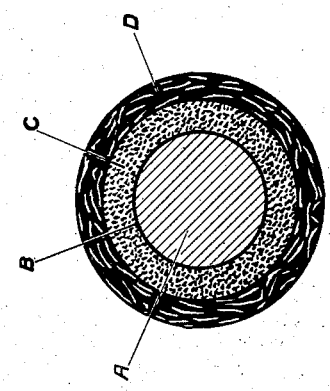
WITNESSES.
INVENTOR.
Arthur E. Whitney
PER
Ralph W. Foster
ATTORNEY.

UNITED STATES PATENT OFFICE.

ARTHUR E. WHITNEY, OF WINCHESTER, MASSACHUSETTS, ASSIGNOR OF ONE-HALF TO ROBERT F. WHITNEY, OF WINCHESTER, MASSACHUSETTS.

HIDE-WORKING MACHINE

No. 872,489.   Specification of Letters Patent.   Patented Dec. 3, 1907.

Application filed February 19, 1906. Serial No. 301,801.

*To all whom it may concern:*

Be it known that I, ARTHUR E. WHITNEY, a citizen of the United States, and a resident of Winchester, in the county of Middlesex and State of Massachusetts, have invented certain new and useful Improvements in Hide-Working Machines, of which the following is a specification.

My invention relates to hide-working machines and more particularly to the bed roll employed in such machines to hold the hide against the work roll. This bed roll comprises a metal shaft covered with an inner layer of soft, or porous, rubber and an outer layer of hard yielding rubber, preferably with a thin priming of hard rubber between said inner layer and said metal shaft.

Heretofore the difficulty has been to procure a shaft of proper weight and rigidity to perform its work and a rubber covering hard enough for the required contact with the work roll and still of sufficient elasticity, or give, to permit lumps in the hide to pass between the work roll and the bed roll without injury to the hide and at the same time to secure a roll complete (shaft and covering) of a diameter small enough to secure the desired contact between the surfaces of the two rolls.

Experience and experiment have shown that the metal shaft should be not less than approximately 3 inches in diameter while the rubber covering should be approximately 1 1/4 to 1 1/2 inches in thickness, making the entire roll 5 1/2 to 6 inches in diameter. Experience and experiment also show that a homogeneous rubber covering of this thickness, 1 1/4 to 1 1/2 inches, if made of rubber hard enough for contact with the work roll, is not yielding enough to take care of the lumps in the passing hide and, conversely, if yielding enough to take care of such lumps, is not hard enough for the contact mentioned. The difficulty has given rise to experiments which have not proved successful. The diameter of the shaft and the thickness of the covering have been varied, but all with unsatisfactory results.

I have conceived the idea of securing a roll having the proper requirements, namely, diameter, hardness of surface and elasticity, by providing a metal shaft approximately 3 inches in diameter and a rubber covering comprising an outer portion of hard yielding rubber and an inner portion of soft, or spongy, rubber. The best results are obtained by making this outer portion of hard yielding rubber of approximately 5/8 inches thickness and the inner portion of soft, or spongy, rubber of approximately the same thickness. This inner portion of soft, spongy rubber is a well known article made of ground rubber mixed with crystals of some leavening agent adapted to produce the desired porosity. The roll is made by placing a priming around the metal shaft, the ground rubber around the priming and the hard rubber around the ground rubber and vulcanizing them in any way desired and by one or more operations. The priming is approximately 1/16 of an inch in thickness, being preferably just thick enough to hold the shaft and spongy rubber together. Preferably the outer portion of the roll is composed of a high grade quality of close grained rubber, the inner portion of the roll is made of the same kind and quality of rubber made spongy in any desired manner, and the priming is made of hard cheap rubber which sticks to the shaft better than softer and purer rubber and to which the soft rubber adheres very firmly and permanently. The priming may be omitted, but the results are not then so satisfactory.

The invention is illustrated by the accompanying drawings in which—

Figure 1 is a plan view of the bed roll with a portion cut away. Fig. 2 is a section on the line 2—2, Fig. 1.

A is the metal shaft.

B is the priming.

C is the inner porous covering.

D is the outer covering of hard rubber.

Having described my invention, what I claim and desire to secure by Letters Patent is:

In a hide working machine, a bed roll approximately six inches in diameter consisting of a metal shaft of a thickness approximately one half the total diameter of the roll, covered with a thin priming and inner and outer coverings of approximately equal thickness of soft spongy and hard close grained rubber respectively, all vulcanized together; substantially as described.

In testimony whereof I have affixed my signature, in presence of two witnesses.

ARTHUR E. WHITNEY.

Witnesses:
RALPH W. FOSTER,
HELEN M. DEARBORN.